United States Patent [19]

Wilkomirsky

[11] Patent Number: 5,676,916
[45] Date of Patent: Oct. 14, 1997

[54] PROCESS FOR EXTRACTING THE BORON CONTENT IN THE BRINE OF NATURAL OR INDUSTRIAL SALT MINES

[75] Inventor: Igor Wilkomirsky, Las Condes, Chile

[73] Assignee: Sociedad Minera Salar de Atacama S.A., Santiago, Chile

[21] Appl. No.: 644,243

[22] Filed: May 10, 1996

[30] Foreign Application Priority Data

May 12, 1995 [CL] Chile ............................................. 711-95

[51] Int. Cl.$^6$ ............................ C01B 35/12; C01B 35/10
[52] U.S. Cl. ................................................ 423/279; 423/283
[58] Field of Search ........................................ 423/283, 279

[56] References Cited

U.S. PATENT DOCUMENTS

| | | | |
|---|---|---|---|
| 2,855,276 | 10/1958 | May et al. | 423/283 |
| 2,969,275 | 1/1961 | Garrett | 423/283 |
| 3,233,704 | 2/1966 | Helbig et al. | 423/283 |
| 3,433,604 | 3/1969 | Grinstead | 423/283 |
| 4,058,588 | 11/1977 | Brown et al. | 423/283 |
| 4,329,154 | 5/1982 | Shono et al. | 423/283 |
| 4,557,913 | 12/1985 | Davis et al. | 423/283 |

FOREIGN PATENT DOCUMENTS

| | | | |
|---|---|---|---|
| 2289446 | 5/1976 | France | 423/283 |
| 2950601 | 6/1981 | Germany | 423/283 |

Primary Examiner—Steven Bos
Attorney, Agent, or Firm—Birch, Stewart, Kolasch & Birch, LLP

[57] ABSTRACT

A process for extracting boron from brines of natural or industrial salt mines which includes the steps of reacting borates contained in the brine with a solution of hydrochloric acid and forming boric acid, cooling the brine containing boric acid, separating the boric acid from the remainder of the brine to obtain impure boric acid and brine having a low boron content, washing the impure boric acid with distilled or demineralized water to obtain purified boric acid, and drying the purified boric acid. Boric acid crystals thus obtained are washed and recrystallized. The remaining boron in the low boron content brine can be removed by extraction in a paraffin solvent. The boron can then be re-extracted from the solvent and converted to boric acid for isolation and purification as above.

15 Claims, 1 Drawing Sheet

PROCESS FOR EXTRACTING THE BORON CONTENT IN THE BRINE OF NATURAL OR INDUSTRIAL SALT MINES

BACKGROUND OF THE INVENTION

The invention relates to a process for extracting the boron contained in the brine of natural or industrial salt mines.

Most brines, whether they come directly from natural salt mines, or whether they originated during industrial processes by means of which some of their mineral components have been extracted, contain important quantifies of boron, generally present as borates, that can be used as a source of boric acid ($BO_3H_3$). Boric acid is useful in various industrial applications such as antiseptics, as an additive when manufacturing heat-resistant glasses, in nickel galvanization baths, and as neutron absorbents in nuclear reactors of the pool type. Their esters are also used as solvents and plastifiers. Compounds such as sodium tetraborate (borax) are widely used in the metallurgic industry as melting substances.

Various procedures for the removal of boron from brines are known.

SUMMARY OF THE INVENTION

The invention, on the contrary, proposes a hybrid process which first recovers a great part of the boron contained in the brine via acidification with hydrochloric acid and second causes crystallization by cooling, which leaves a contents of boron lower than 0.3% by weight in the remaining brine. The boric acid crystals obtained in this stage are washed and, eventually, recrystallized, obtaining in this manner a boron recovery higher than 70% with a purity of 99%. The brine having a residual boron content lower than 0.3% by weight is treated by means of extraction by solvents taking into account one or more re-extraction stages.

DETAILED DESCRIPTION OF THE INVENTION

Figure 1:
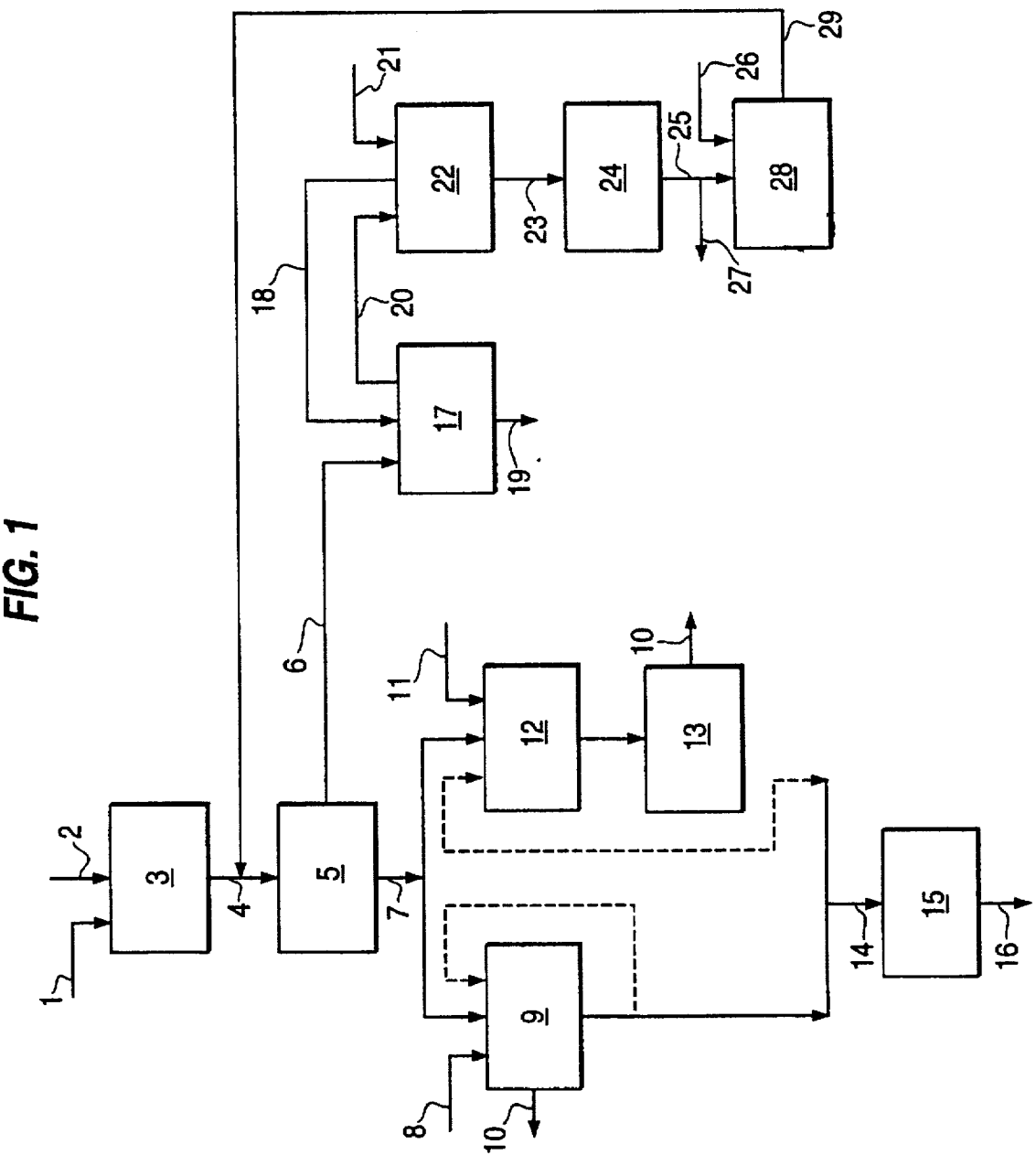
FIG. 1 corresponds to a flow diagram of the operations that make up the process of the invention.

For a better understanding of the invention, it will be described in greater detail, with respect to the drawing.

The brine to be treated, which comes from a salt mine, consists mainly of the following elements, whose typical ranges are indicated in percent by weight:

| | |
|---|---|
| water | 50–60% |
| chloride | 30–38% |
| lithium | 5–7% |
| magnesium | 1–2.5% |
| boron | 0.5–1.5% |
| sodium | 0.01–0.15% |
| calcium | 0.02–0.05% |
| sulfate | 0.01–0.03% |
| potassium | 0.01–0.02% |

This brine 1 is acidulated with a solution of hydrochloric acid 2 in a reactor 3, that consists in a mixer, in such a manner that the acidity of the solution remains within the range of pH 0 to 4, measured using a brine/water relationship of 1/10 and the borates are successfully transformed into boric acid. The concentration of hydrochloric acid in the saline solution is between 0.05 and 2.00 mol. The main reactions that lead to the precipitation of the boric acid in this stage are the following:

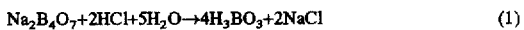

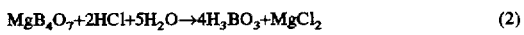

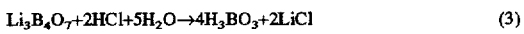

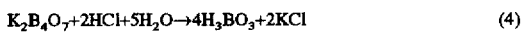

The brine which now contains boric acid 4, and which results from the acidulation stage in the reactor 3, can be precipitated and crystallized by cooling at 5 at temperatures between −10° C. and 10° C., and can be realized, for example, in pools or ponds.

At the end of the precipitation and crystallization stage 5, there are obtained via decantation and draining, on the one hand, a brine 6, with a boron content lower than 0.3% by weight and, on the other hand, crystallized boric acid 7, which can be subjected to one or more cold washing cycles 9, or to one or more dissolution cycles 12 and further cooling or re-crystallization 13. In the case where one or more of the cold washing stages 9 is applied, the washing water 8, which is distilled or demineralized water, is at a temperature between −10° C. and 10° C., and takes care of removing the impurities found lodged between the crystals. This washing stage produces boric acid 14, with a purity higher than 95% and discard solutions 10.

As an alternative to the cold washing stage or stages 9, the boric acid crystals 7 can be subjected to one or more dissolution stages 12 in hot distilled or demineralized water 11 at a temperature comprised between 60° C. and 80° C., and a further stage of crystallization 13, by means of cooling between −10° C. and 10° C. The boric acid solubility is 36 gr/100 cc of water at 80° C., while the same decreases to 4 gr/100 cc at 10° C. The crystallization stage 13 produces boric acid 14, with a purity higher than 95% and discard solutions 10.

The purified boric acid 14 is subjected finally to a drying 15 at a temperature no higher than 80° C., and dry boric acid 16 is obtained.

The brine 6, with a boron content lower than 0.3% by weight obtained in the precipitation and crystallization stage 5, is subjected to one or more extraction stages via solvents 17, for extracting the remaining boron. The extractant utilized for effecting the extraction consists of one or more high-aliphatic alcohols with five or more carbons in its structure, such as isopentanol, isooctyl, isobutyl, or isoamyl alcohol, or a diol, such as, for example, -1,2-octane diol, 2-ethyl-1,3-hexane diol, 2-ethyl-2-butyl-1,3-propane diol, 1,3-propane diol, 2,3-naphthalene diol, 1,2-cyclopentane diol. These extractants are found dissolved in a paraffin solvent, for example, kerosene or petroleum ether, at an extractant/solvent rate between 1/20 and 1/1, maintaining an organic/aqueous rate between 5/1 and 1/5, and with an acidity equivalent to a pH between 0 and 4, measured in a brine/water solution of 1/10 defining an organic phase 18. These phases are maintained in contact for 5 to 100 minutes.

In the extraction stage via solvents 17, a boron-deprived brine 19 containing less than 5 ppm of boron, is obtained, which can be treated by means of processes for extracting other substances. During the extraction stage 17, a boron-loaded organic 20 is also obtained, which is subjected to one or more extraction or stripping stages 22, for which the loaded organic 20 is mixed with an alkaline solution 21, consisting of a sodium or potassium hydroxide solution with a concentration between 0.01 and 0.5 mol and at an organic/aqueous rate between 1/5 and 5/1, wherein the aqueous part is the solution of sodium or potassium hydroxide. These phases are maintained in contact for 5 to 100 minutes.

In the re-extraction stage 22, one obtains, on the one hand, an alkaline aqueous solution 23 containing borates, and, on the other hand, one obtains the regenerated organic 18, and there the solution is returned to the extraction stage via solvents 17.

The aqueous solution 23 containing boron is subjected to an evaporation 24, a drying, and borate precipitates 25 are obtained, which can be marketed as technical grade 27 borates or can be purified, making them react in a reactor 28 with a solution of hydrochloric acid 26 at 0.05 per 1 mol, and a boric acid solution 29 with a boric acid concentration of 30 g/l is obtained, which is treated in the precipitation and crystallization stages 5 and following until dry boric acid 16 with a purity higher than 95% is obtained.

EXAMPLE

The brine selected was taken from the Atacama, Chile, salt mine, wherein the sodium and potassium (as KCl and NaCl) had been extracted, and which had the following composition in weight:

| | |
|---|---|
| water | 54.1% |
| chloride | 35.8% |
| lithium | 5.80% |
| magnesium | 1.75% |
| boron | 0.8% |
| sodium | 0.07% |
| calcium | 0.04% |
| potassium | 0.02% |
| sodium | 0.02% |

This brine was treated with a hydrochloric acid solution of 0.5 mol, until a pH of 1.5 was reached, measured in a brine/water solution of 1/10, mixed in a pond by means of stirring. The acidulated brine was cooled for 24 hours at a temperature oscillating between 2° C. and 3° C., precipitating 82% of the boron content in the form of boric acid. The boric acid crystals were washed with distilled water at a temperature between 3° C. and 4° C. The boric acid obtained had a purity of 99.52% $H_3BO_3$, with a global recovery of 79.6%.

The brine, with a boron residual content of 0.14% and pH of 2.5, was treated by means of extraction via solvents, utilizing a mixture of 5 to 90% by volume of isopentanol, 10 to 70% by volume of isooctyl alcohol, and 5 to 20% by volume of isobutyl alcohol, and 5 to 20% by volume of isoamyl alcohol dissolved in kerosene, in a proportion of 20% of aliphatic alcohols and 80% of kerosene.

The brine was treated in five extraction stages, with a rate of organic/brine equal to 2/1, with an average contact time of 8 minutes and with 22 minutes of rest. The boron-deprived brine, obtained during the extraction stage, presented a residual boron content of 0.002% by weight.

The loaded organic was treated with a solution of 0.10 mol of sodium hydroxide, at an organic/aqueous rate of 2/1 and in six re-extraction stages, for an average time of 5 minutes per stage, and it was left to rest for 8 minutes per stage to separate the phases.

The organic obtained, free of boron, was returned to the extraction stage, while the alkaline solution, with a boron content of 4.2% in volume, was evaporated until a solid residue of hydrated sodium tetraborate was obtained. The residue was redissolved with hydrochloric acid 0.3 mol until a free boric acid content in a solution of 35 gr/l was obtained.

The resulting solution was cooled at 2° C. for 24 hours, precipitating 70.5% of the boron as boric acid, which was washed with pure water at 4° C., and, finally, was dried, obtaining boric acid with a purity of 98.9%.

I claim:
1. A process for recovering boron from brine, which comprises:
   (a) reacting a borate-containing brine with a sufficient amount of hydrochloric acid to maintain a pH of from 0 to 4, measured for a dilution of water/brine of 10/1, in order to form boric acid-containing brine;
   (b) cooling said boric acid-containing brine to a temperature of from −10° C. to 10° C. to precipitate said boric acid;
   (c) separating said boric acid precipitate from said brine to obtain impure boric acid crystals and boron depleted brine;
   (d) washing said impure boric acid crystals with distilled or demineralized water to obtain purified boric acid;
   (e) contacting, in one or more stages, said boron depleted brine with an organic medium comprising a paraffin solvent having dissolved therein one or more extractants selected from the group consisting of aliphatic alcohols having at least 5 carbon atoms, diols and mixtures thereof, to extract additional borate from said boron depleted brine and form a borate-loaded organic medium;
   (f) contacting, in one or more stages, said borate-loaded organic medium with an aqueous alkaline solution to re-extract said borate from said borate-loaded organic medium to regenerate said organic medium and form a borate-containing aqueous solution; and
   (g) evaporating said borate-containing aqueous solution to form a borate precipitate.

2. The process according to claim 1, wherein the washing of step (d) comprises one or more washing steps carried out with distilled or demineralized water, at a temperature between −10° C. and 10° C.

3. The process according to claim 1, wherein the washing of step (d) comprises one or more hot wash steps carried out with distilled or demineralized water, at a temperature between 60° C. and 80° C.; each one of said hot wash steps being followed by a crystallization step comprised of cooling said hot washed boric acid to a temperature between −10° C. and 10° C.

4. The process according to claim 1, wherein said extractants in step (e) comprise between 5% and 90% by volume of isopentanol, 10% to 70% by volume of isooctyl alcohol, and 5% to 20% in volume of isoamyl alcohol.

5. The process according to claim 1, wherein said extractants in step (e) comprise 1,2-octane diol, 2-ethyl-1,3-hexane diol, 2-ethyl-2-butyl-1,3-propane diol, 1,3-propane diol, 2,3-naphthalene diol, 1,2-cyclopentane diol or a mixture thereof.

6. The process according to claim 1, wherein said aqueous alkaline solution comprises sodium hydroxide or potassium hydroxide.

7. The process according to claim 1, which further comprises reacting said borate precipitate with hydrochloric acid to form boric acid, precipitating said boric acid and washing said precipitate to form purified boric acid.

8. The process according to claim 7, wherein said reacting, precipitating and washing steps are carried out by subjecting said borate precipitate to said steps (a) through (d) with said brine.

9. The process according to claim 1, further comprising drying said purified boric acid produced in step (d) by heating to a temperature of 80° C. or less.

10. The process according to claim 1, wherein said boron depleted brine produced in step (c) contains 0.3% by weight or less of boron.

11. The process according to claim 1, wherein said regenerated organic medium produced in step (f) is used as said organic medium in said step (e).

12. The process according to claim 1, wherein said extractants and paraffin solvent are contained in said organic medium in a ratio of from 1/20 to 1/1.

13. The process according to claim 12, wherein said organic medium and boron depleted brine are contacted in each stage of step (e) at a ratio of from 1/5 to 5/1, respectively, for a duration of 5 to 100 minutes.

14. The process according to claim 13, wherein said extractant is selected from the group consisting of isopentanol, isooctyl alcohol, isoamyl alcohol, 1,2-octane diol, 2-ethyl-1,3-hexane diol, 2-ethyl-2-butyl-1,3-propane diol, 1,3-propane diol, 2,3-naphthalene diol, 1,2-cyclopentane diol, and mixtures of two or more thereof.

15. The process according to claim 1, wherein said borate-loaded organic medium and aqueous alkaline solution are contacted in each stage of step (f) at a ratio of from 1/5 to 5/1, respectively, for a duration of 5 to 100 minutes.

* * * * *